(12) United States Patent
Richards

(10) Patent No.: US 6,477,267 B1
(45) Date of Patent: Nov. 5, 2002

(54) IMAGE CONVERSION AND ENCODING TECHNIQUES

(75) Inventor: Angus Duncan Richards, Coma (AU)

(73) Assignee: Dynamic Digital Depth Research Pty Ltd., Bentley (AU)

( * ) Notice: Subject to any disclaimer, the term of this patent is extended or adjusted under 35 U.S.C. 154(b) by 0 days.

(21) Appl. No.: 09/102,247

(22) Filed: Jun. 22, 1998

(Under 37 CFR 1.47)

Related U.S. Application Data

(63) Continuation of application No. PCT/AU96/00820, filed on Dec. 20, 1996.

(30) Foreign Application Priority Data

Dec. 22, 1995 (AU) .............................................. PN7323

(51) Int. Cl.⁷ .................................................. G06K 9/00
(52) U.S. Cl. ........................................ 382/154; 345/418
(58) Field of Search ................................ 382/154, 282, 382/385; 348/42; 345/419, 420, 435, 418, 421, 425, 426, 430, 474

(56) References Cited

U.S. PATENT DOCUMENTS

| | | |
|---|---|---|
| 4,704,627 A | 11/1987 | Yuyama et al. |
| 4,925,294 A | 5/1990 | Geshwind et al. |
| 5,819,017 A | 10/1998 | Akeley et al. |
| 5,933,547 A | 8/1999 | Dudon et al. |
| 6,108,005 A * | 8/2000 | Starks et al. ................ 345/419 |

FOREIGN PATENT DOCUMENTS

| | | |
|---|---|---|
| CA | 2252063 | 4/2000 |
| DE | 233475 A1 | 2/1986 |
| EP | 0 669 758 B1 | 8/1995 |
| EP | 0506429 | 1/1999 |
| EP | 0641132 B1 | 4/1999 |
| GB | 2260421 | 4/1993 |
| WO | WO94/14285 | 6/1994 |
| WO | WO96/37799 | 11/1996 |
| WO | WO99/03068 A1 | 1/1999 |
| WO | WO99/12127 A1 | 3/1999 |

* cited by examiner

*Primary Examiner*—Samir Ahmed
(74) *Attorney, Agent, or Firm*—Banner & Witcoff, Ltd.

(57) ABSTRACT

A method of producing left and right eye images for a stereoscopic display from an original 2D image including the steps of: a) identifying at least one object within said original image, b) outlining said or each object, c) defining a depth characteristic for said or each object, d) respectively displacing selected areas of said or each image by a determined amount in a lateral direction as a function of the depth characteristic of said or each object, to form two stretched images for viewing by the left and right eyes of the viewer.

19 Claims, 14 Drawing Sheets

Figure 1A:
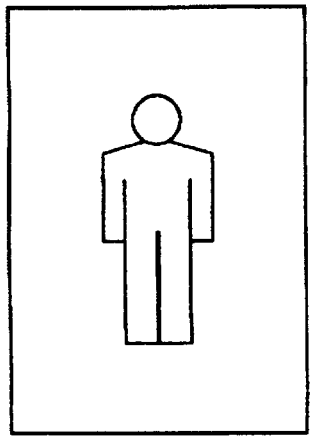

| | | | |
|---|---|---|---|
| Row 0 | -8 | -4 | -3 |
| Row 1 | -5 | -2 | -1 |
| Row 2 | -1 | 0 | +2 |
| Row 0 | +3 | +1 | +4 |

| | | | |
|---|---|---|---|
| Row 0 | +8 | +4 | +3 |
| Row 1 | +5 | +2 | +1 |
| Row 2 | +1 | 0 | -2 |
| Row 0 | -3 | -1 | -4 |

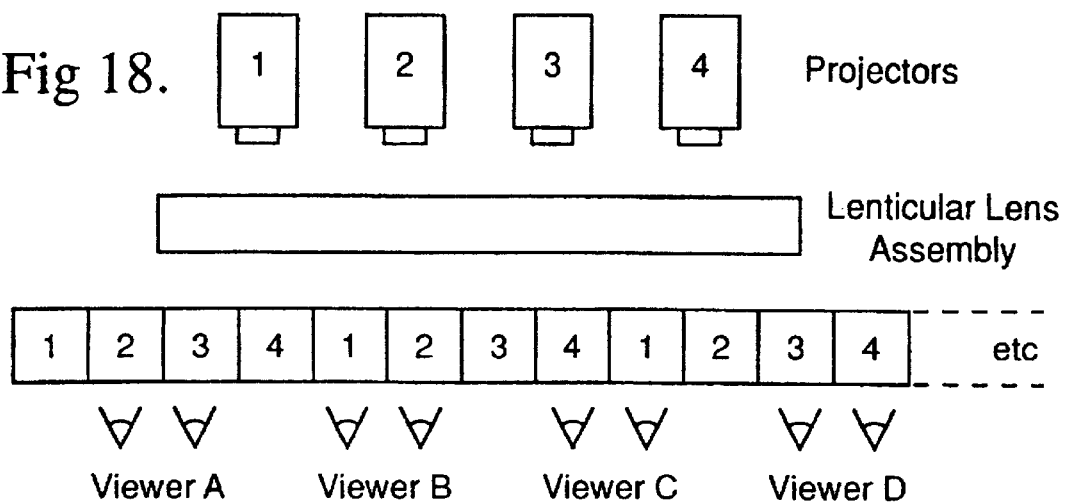
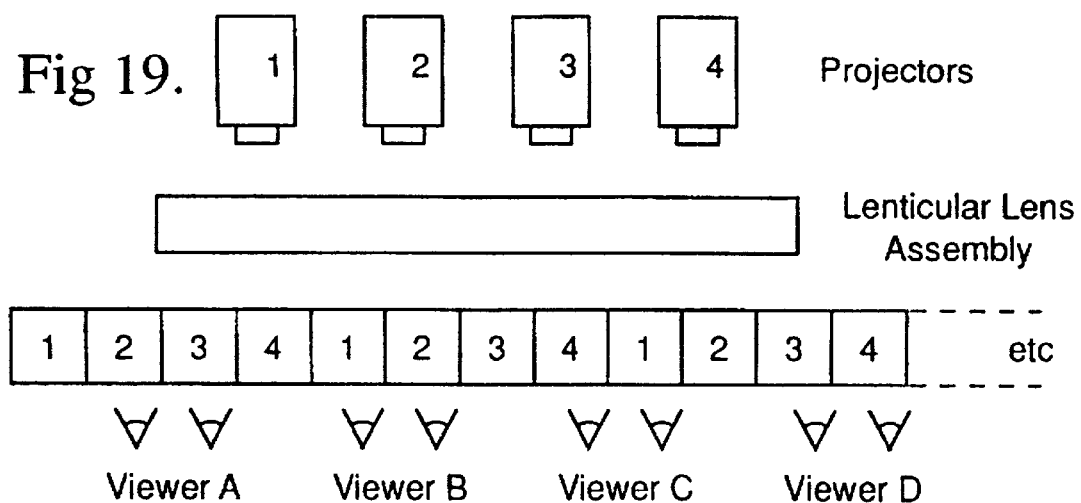
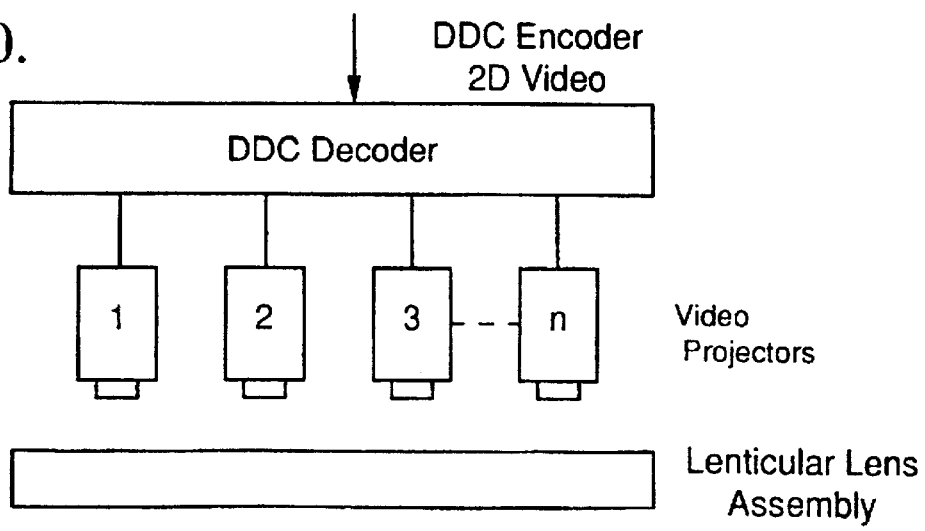

IMAGE CONVERSION AND ENCODING TECHNIQUES

The present application is a continuation of and claims priority to International Application No. PCT/AU96/00820 filed Dec. 20, 1996 and Australian provisional Application No. PN 7323 filed Dec. 22, 1995, the teachings of both of which are incorporated herein by reference.

The present invention is generally directed towards stereoscopic image synthesis and more particularly toward a method of converting two dimensional (2D) images for further encoding, transmission and decoding for the purpose of stereoscopic image display on two dimensional (2D) or three dimensional (3D) stereoscopic displays systems.

Recent improvements in technology in the areas of compact high performance video projection systems, image processing, digital video and liquid crystal panels have made possible many practical 3D display systems utilising both active and passive polarising glasses and both single and multi-viewer autostereoscopic displays.

Three dimensional display systems have moved out of the arena of being technological curiosities and are now becoming practical display systems for entertainment, commercial and scientific applications. There has now emerged the requirement for 3D media to display on these devices. Traditionally there has been just two ways to produce this 3D media (ie media produced that contains image information for at least two separate views of the same scene from different perspective's). These are:

1) Generation of two separate views (usually in real time) by a computer.
2) Videoing or filming with two laterally displaced cameras.

In the case of computer generated images for usage in Computer Aided Design (CAD) systems, simulators or video game equipment, it is not a complex process to produce two separate images with different perspective's.

The filming of movies utilising two laterally displaced cameras to produce 3D has been well understood for many years. However, there are many problems with this approach. It is considerably more difficult to film or video in 3D than in 2D because there are limits to the permissible distance between the nearest and farthest objects in the scene (practical 3D depth of field) as well as framing problems (such as near objects being seen on only one camera and thus highlighting the inaccuracy of the 3D image generation when re-played. Another problem is maintaining a smooth pan without causing false 3D artefacts due to latency between the images from the two cameras and so on.

Because of the complexity, high cost of production and implementation, and the fact that there are as yet still only a very small number of 3D display systems being produced for the domestic and commercial markets there has not been a large incentive for the major producers of films or videos to produce 3D media. However, if a technique was devised that would allow conventional 2D films to be re-processed into a 3D version then it would be possible to not only convert new films into 3D format for significantly less cost than filming them directly in 3D in the first place but it would also make possible the re-processing of the vast archives of 2D film and video material for re-release to both the cinema and video markets.

It would however be advantageous to be able to convert an existing 2D image so that it can be viewed as a 3D image. One way of achieving this is to convert a single 2D image to two separate left and right images by a 'cut and paste' technique. In this technique, an object is 'cut' from the image and laterally displaced left or right then 'pasted' back onto the original image to produce the required separate images. This however results in a blank region in the area formally occupied by the object within the image.

It is therefore an object of the present invention to overcome or minimise at least one of these problems.

With this in mind, the present invention provides in one aspect, a method of producing left and right eye images for a stereoscopic display from an original 2D image, wherein selected areas of said original image are displaced by a determined amount and direction to thereby generate stretched images, said stretched images forming said left and right eye images.

The two converted images when respectively viewed by the left and right eye of a viewer can provide a 3D image without any blank region as would be the case with images produced by the 'cut and paste' technique.

This document covers some of the major algorithmic processes involved in the conversion of 2D media to 3D format, a new composite data format which is suitable for the communication and storage of this new 3D media. It also discusses several hardware implementations for the real-time encoding, transmission and decoding of this new 3D format.

The main benefits of the technology is that there are significant cost saving and media supply advantages.ie. Only one camera has to be used for filming. Due to the nature of the 2D to 3D conversion process it is possible to package and transfer the image media virtually unchanged except for the addition of a small packet of 3D data that doesn't in any way encumber the final 2D display process. In fact it enables the images to be displayed on standard 2D televisions in 2D or 3D (usage of shutter glasses or similar required) without degradation of image quality whilst also allowing display on 3D televisions or other displays in 3D.

The final stage of the 2D to 3D conversion process is completed in real-time at the receiver and thus the increased bandwidth requirements for displaying 3D images is local to the television decoder and does not adversely affect the channel handling capacity of the television carrier.

According to another aspect of the present invention there is provided a method of describing the changes to be made to an original 2D image for converting said 2D image into stretched images for a stereoscopic display.

According to a further aspect of the present invention, there is provided a method of encoding a video signal of a 2D image for allowing conversion of said video 2D image to stretched images for a stereoscopic display.

According to yet another aspect of the present invention, there is provided a method of receiving a video signal of a 2D image including encoding data, and extracting the encoding data from the video signal for allowing conversion of the 2D image to stretched images for a stereoscopic display.

According to a further aspect of the present invention, there is provided a method of manipulating a 2D video image with encoding data to thereby provide stretched images for a stereoscopic display.

According to another aspect of the present invention, there is provided a method of producing left and right eye images for a stereoscopic display from an original 2D image including the steps of:

a) identifying at least one object within said original image,
b) outlining said or each object,
c) defining a depth characteristic for said or each object,
d) respectively displacing selected areas of said or each image by a determined amount in a lateral direction as a function of the depth characteristic of said or each object, to form two stretched images for viewing by the left and right eyes of the viewer.

These image pairs may be either mirrored or similar to each other so that the stereoscopic 3D effect is optimised.

The image may include a plurality of objects with each object being provided with a said respective depth characteristic. Images may be converted on an individual basis. Alternatively, a series of related images as in a video or film may be converted.

The image may be digitised and the image may be stretched or converted electronically by temporarily placing a mesh over the image, the mesh initially having a plurality of parallel lateral mesh lines and a plurality of parallel longitudinal mesh lines positioned at right angles to the lateral mesh lines. Each intersection of the mesh lines on the mesh may provide a mesh sub-point. The image can move together with the mesh so that distortion of the mesh results in the stretching of the underlying image. The mesh lines may remain continuous to provide for a smooth stretching of the image. The amount of displacement of each of the mesh sub-points from their initial position may provide the conversion data for said original image. The sub-points may be displaced in a lateral direction.

The displacement of the mesh sub-points may also be defined by a mathematical algorithm to thereby provide for automatic conversion of images. Further enhancements to the method could be to add shadow, blurring and motion interpolation data to the conversion data including force paralex information and field delay and direction for motion paralex delays.

It would be advantageous to be able to use existing image transmission systems to transmit an image that can be viewed as a 3D image. The present invention can be applicable for use in image transmission systems sending video signals that provide 2D images.

According to a further aspect of the present invention there is provided a method of producing a set of 'object scripting' data from the conversion/stretching process that describes which objects in an image are selected for processing, how they will be processed, their priority or otherwise over other objects and their depth characteristics. This scripting data may be stored in the memory of a computer for later usage to reprocess the original 2D images or transmitted to another site (assuming the other site has the same 2D images) for reproduction of the 3D images.

Therefore, according to a further aspect of the present invention there is provided an encoder for encoding a video signal providing a 2D video image, including:

adding conversion data to the video signal to provide the encoded signal, the data defining the displacement of respective selected points of the video image for converting the video image to a stretched image for a stereoscopic display.

By adding the conversion data to the video signal, existing transmission systems can be used to transmit the encoded signal. Various arrangements may be provided to add the conversion data to the video signal. For example, the data may be included in the blank lines of the transmitted video image at the lop and bottom of the image or in the horizontal sync period or horizontal overscan regions of each line.

This invention is not limited to the conversion of existing 2D video images. Rather the process can be readily used lo produce the conversion data simultaneously with the creation of the 2D video image.

Therefore, according to a further aspect of the present invention there is provided a method of producing a 2D video image encoded with 3D conversion data including:

capturing video images from a plurality of video cameras;

comparing the video images from each respective video camera in order to produce the conversion data, the conversion data defining the displacement of respective points of the video image for converting the video image to a stretched image for a stereoscopic display; and combining the video signal from one of said video cameras with the conversion data to thereby produce the encoded video signal.

In a further aspect of the present invention there is provided a method of producing a 2D video image encoded with 3D conversion data including:

capturing left and right eye video images from a stereoscopic video camera;

comparing the left and right eye video images from the stereoscopic video camera in order to produce the conversion data, the conversion data defining the displacement of respective points of the video image for converting the video image to a stretched image for a stereoscopic display; and combining the video signal from said video camera with the conversion data to thereby produce the encoded video signal.

In yet a further aspect of the present invention there is provided a system of producing a 2D video signal encoded with 3D conversion data including:

at least a first and second video camera displaced laterally relative to each other;

conversion means for producing the conversion data, said conversion means receiving data from said video cameras and comparing the data to thereby produce the conversion data, said conversion data defining the displacement of respective points of the video image from one of said video cameras for converting the video image to a stretched image for a stereoscopic display;

an encoder means for combining the video signal from said one video camera with the conversion data from said conversion means to thereby produce the encoded video signal.

Where the 2D video image encoded with the 3D conversion data is only required for a single viewer, only two video cameras are required, each camera representing the view seen by the left and right eyes of the viewer.

In yet another aspect the present invention provides a system of producing a 2D video signal encoded with 3D conversion data including:

a stereoscopic video camera;

conversion means for producing the conversion data, said conversion means receiving data from said video camera and comparing the data to thereby produce the conversion data, said conversion data defining the displacement of respective points of the video image for converting the video image to a stretched image for a stereoscopic display;

an encoder means for combining the video signal with the conversion data from said conversion means to thereby produce the encoded video signal.

According to yet another aspect of the present invention, there is provided a decoder for decoding a video signal for providing a stereoscopic display, the signal providing a 2D video image and further including conversion data for converting the video image, the conversion data defining the displacement of respective points of the video image for converting the video image to a stretched image for a stereoscopic display, the decoder including:
 a) means for receiving the video signal; and
 b) decoding means for reading the conversion data and for controlling the video signal to thereby provide a converted video signal.

The decoder may include
 a) an RGB or component video converter for converting the video signal Into separate video components thereof,
 b) analog to digital conversion means for converting each video component to a respective digital signal, and
 c) digital storage means for storing said digital signals.

The decoding means may control a variable frequency clock means controlling the read out rate of the digital storage means whereby the storage means are read out at a variable rate. This results in the video image being stretched or compressed in accordance with the conversion data.

Alternatively, the RGB or video components may be read into the storage means at a variable rate, and read out of the storage means at a fixed rate.

The decoder may process a single video line or may also process multiple lines such as in a complete field or frame. In this case the full mesh from the conversion data is restored with pixel distortions (lateral shifts) being calculated over the complete field or frame.

The storage means may be in the form of a dual port RAM line store.

A digital to analog conversion means may be provided for converting the read out digital signal to a converted video signal to enable viewing on viewing means. The viewing means may include a television or other screen for viewing the converted video image. The viewing means may further include shutter glasses controlled by the decoder to enable the converted video image to be viewed as a stereoscopic image.

Alternatively, the decoder may include parallel storage means for storing digital signal for the converted left and right video images respectively. The viewing means may then include a display unit for simultaneously projecting the left and right video images.

The decoder means may include separation means for separating the conversion data from the video signal.

According to a further aspect of the present invention, there is provided a stereoscopic image display system including:
 a) an encoder for encoding a video signal providing a video image with conversion data, the conversion data defining displacement of respective points of the video image for converting the video image to a stretched image for a stereoscopic display; and
 b) a decoder for separating the conversion data from the video signal and for converting the video signal as a function of the conversion data.

According to yet another aspect of the present invention, there is provided a multiviewer stereoscopic display system including:
 a) a decoder for decoding a video signal for providing a stereoscopic display, the signal providing a 2D video image and further including conversion data for converting the video image, the conversion data defining the displacement of respective points of the video image for converting the video image to a stretched image for a stereoscopic display, the decoder including means for receiving the video signal and decoding means for reading the conversion data and for controlling the video signal to thereby provide a converted video signal;

It will be convenient to further describe the invention by reference to the accompanying drawings which illustrate possible implementations of the present invention.

Other implementations of the invention are also possible and consequent the particularities of the accompanying drawings is not to be understood as superseding the generality of the preceding description.

Figure 1B:
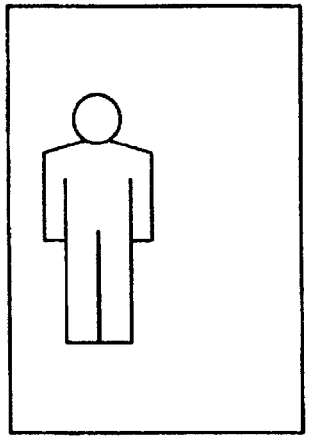
Figure 1C:
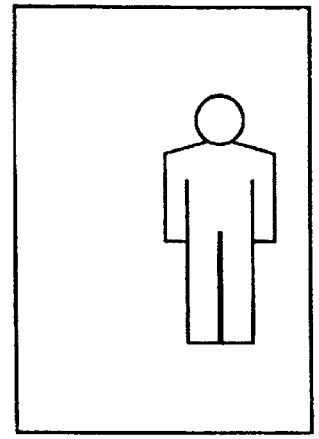
Figure 2A:
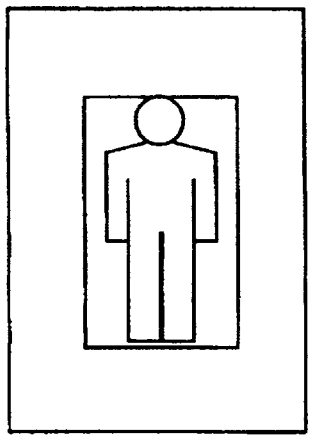
Figure 2B:
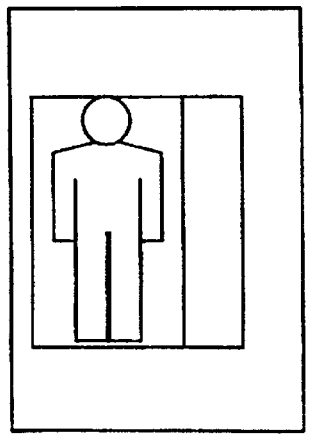
Figure 2C:
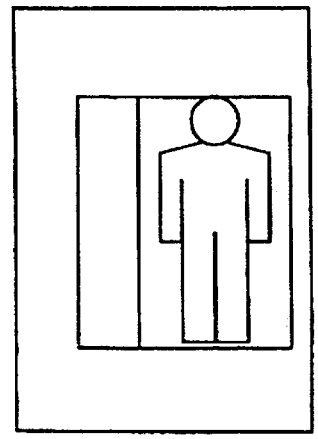
Figure 3A:
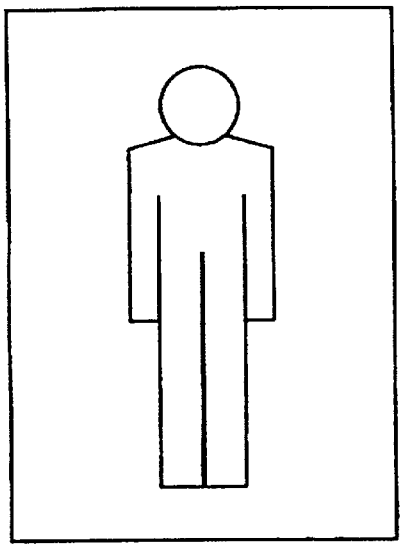
Figure 3B:
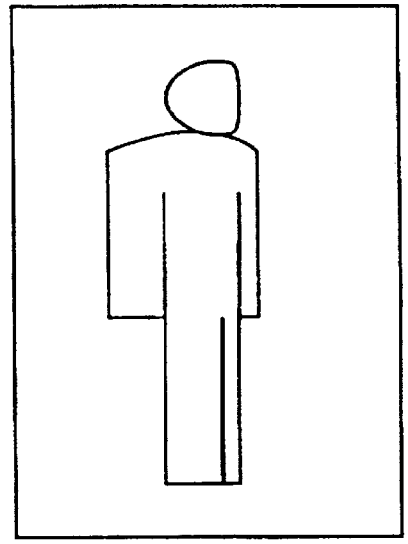
Figure 4A:
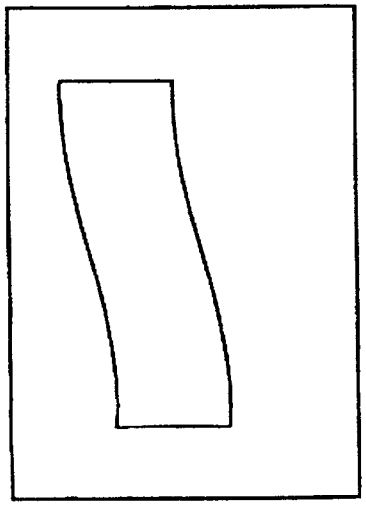
Figure 4B:
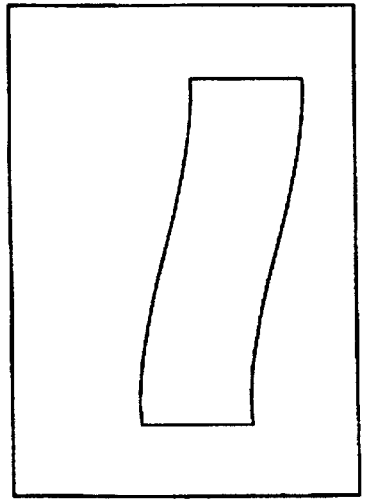
Figure 4C:
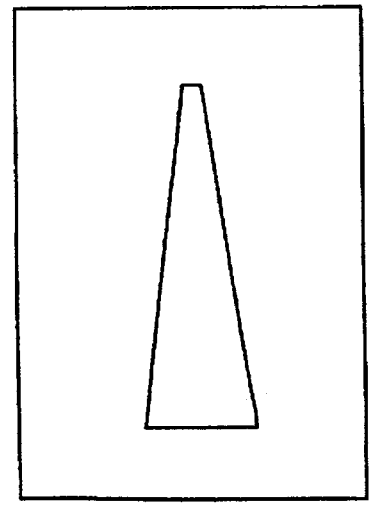
Figure 5:
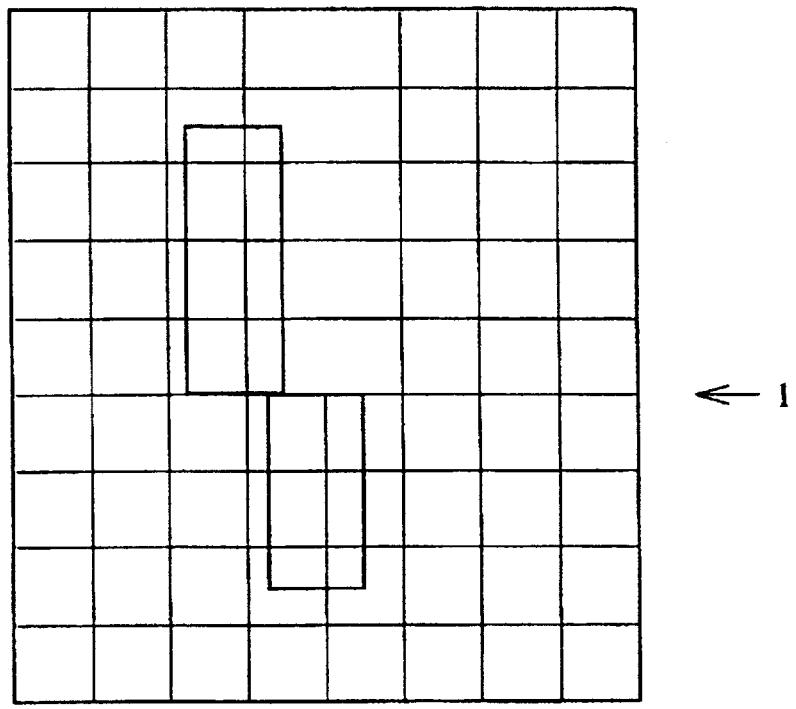
Figure 6:
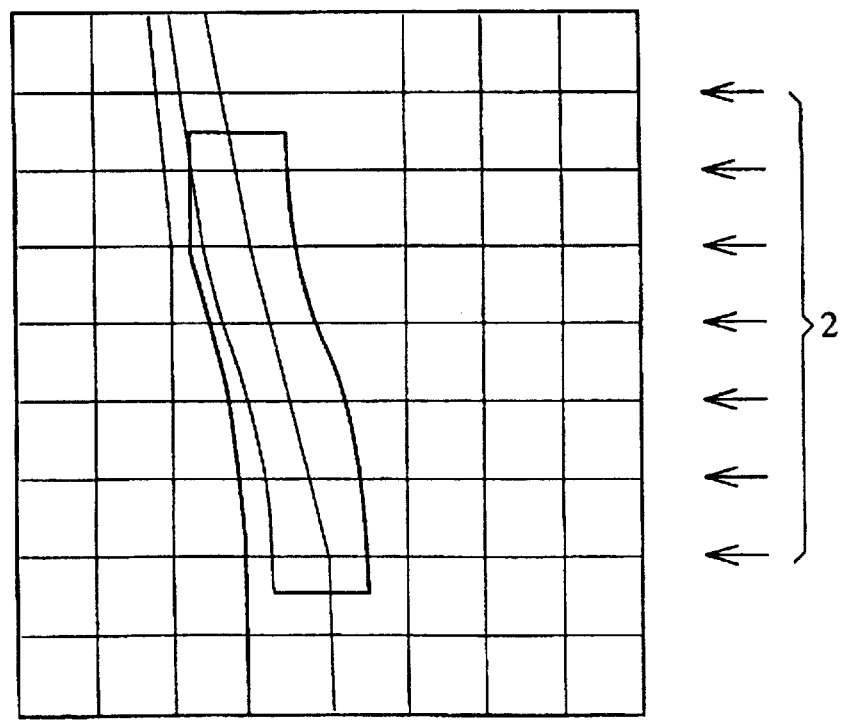
Figure 7A:
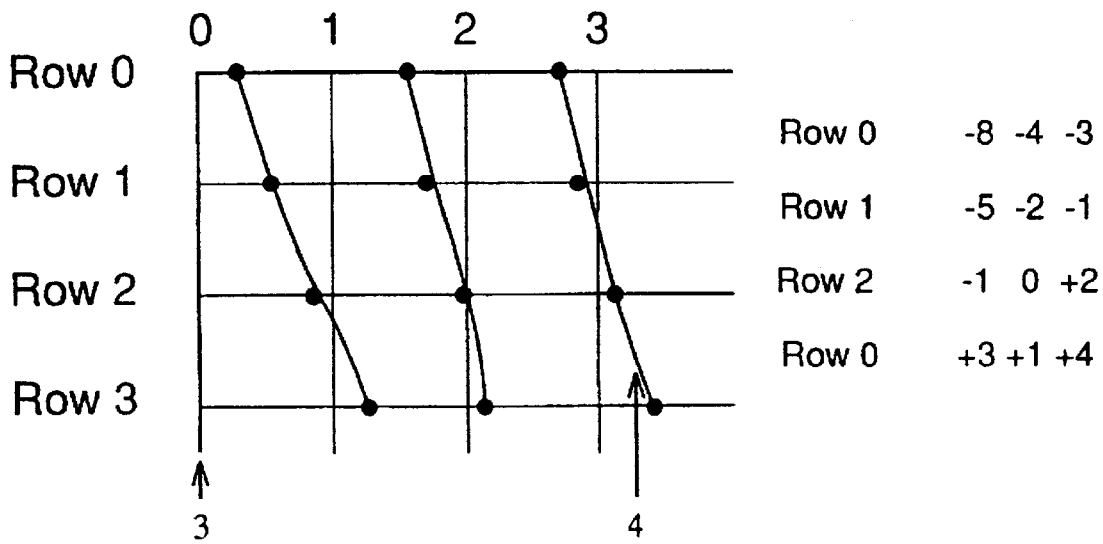
Figure 7B:
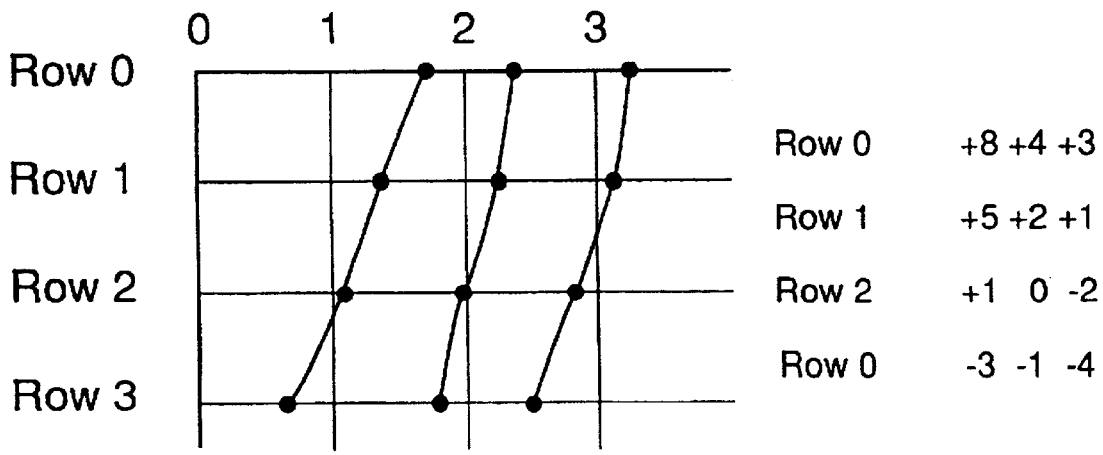
Figure 8:
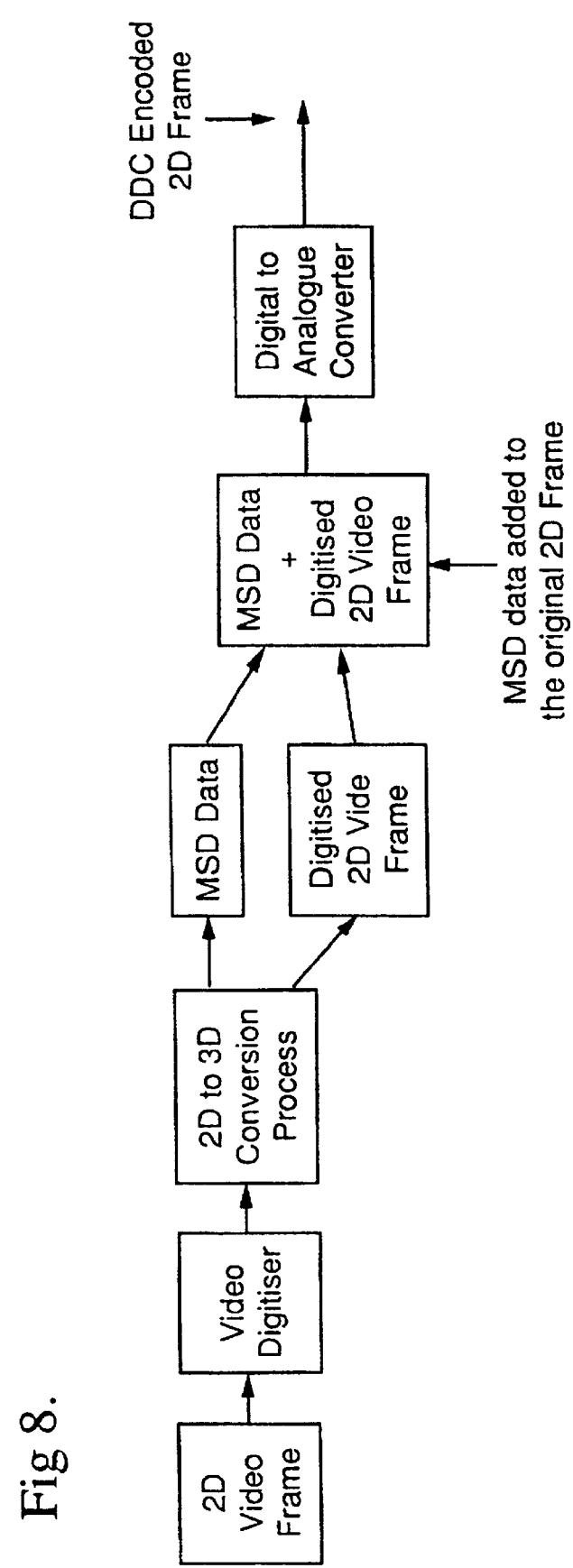
Figure 9:
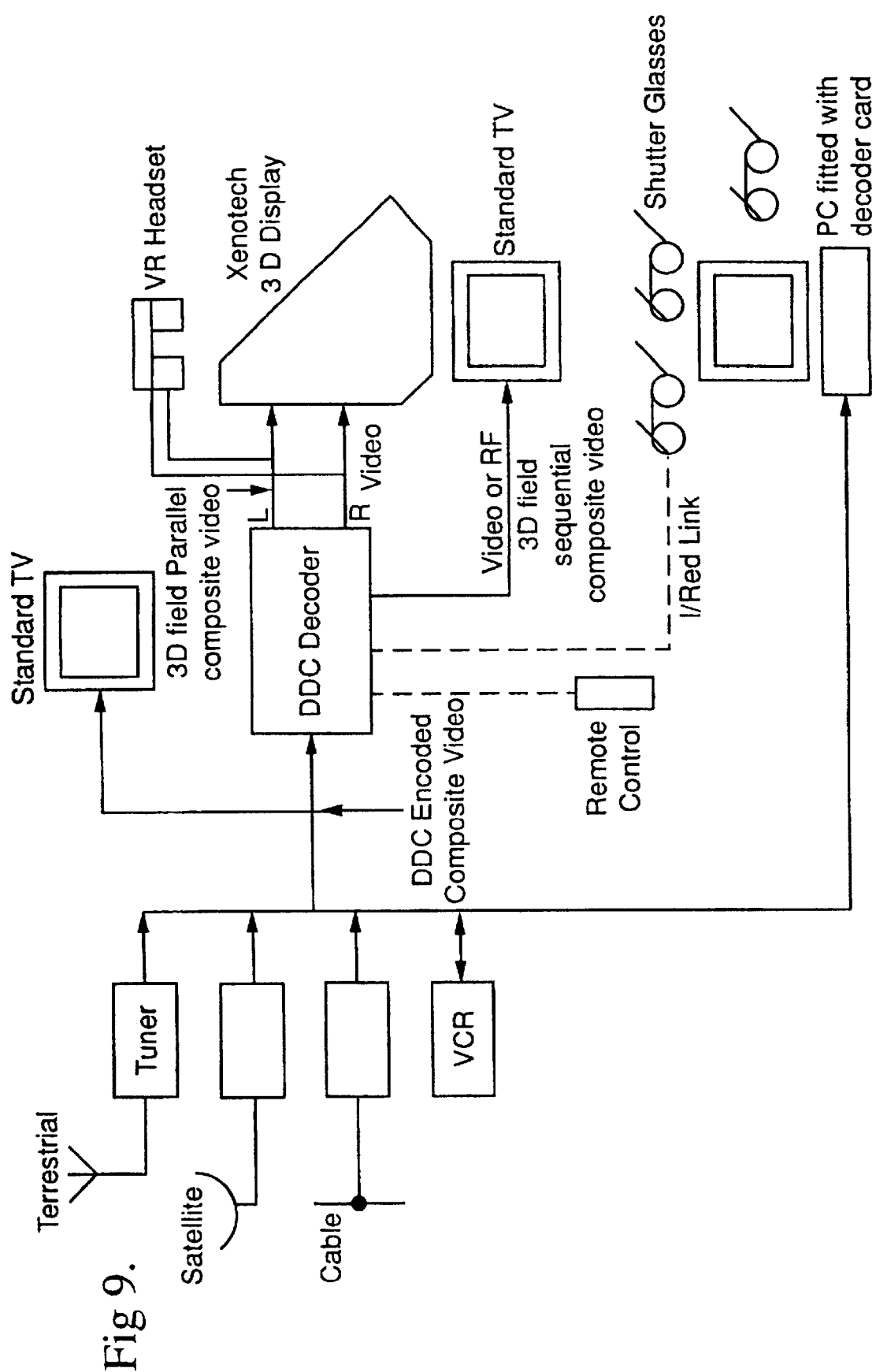
Figure 10:
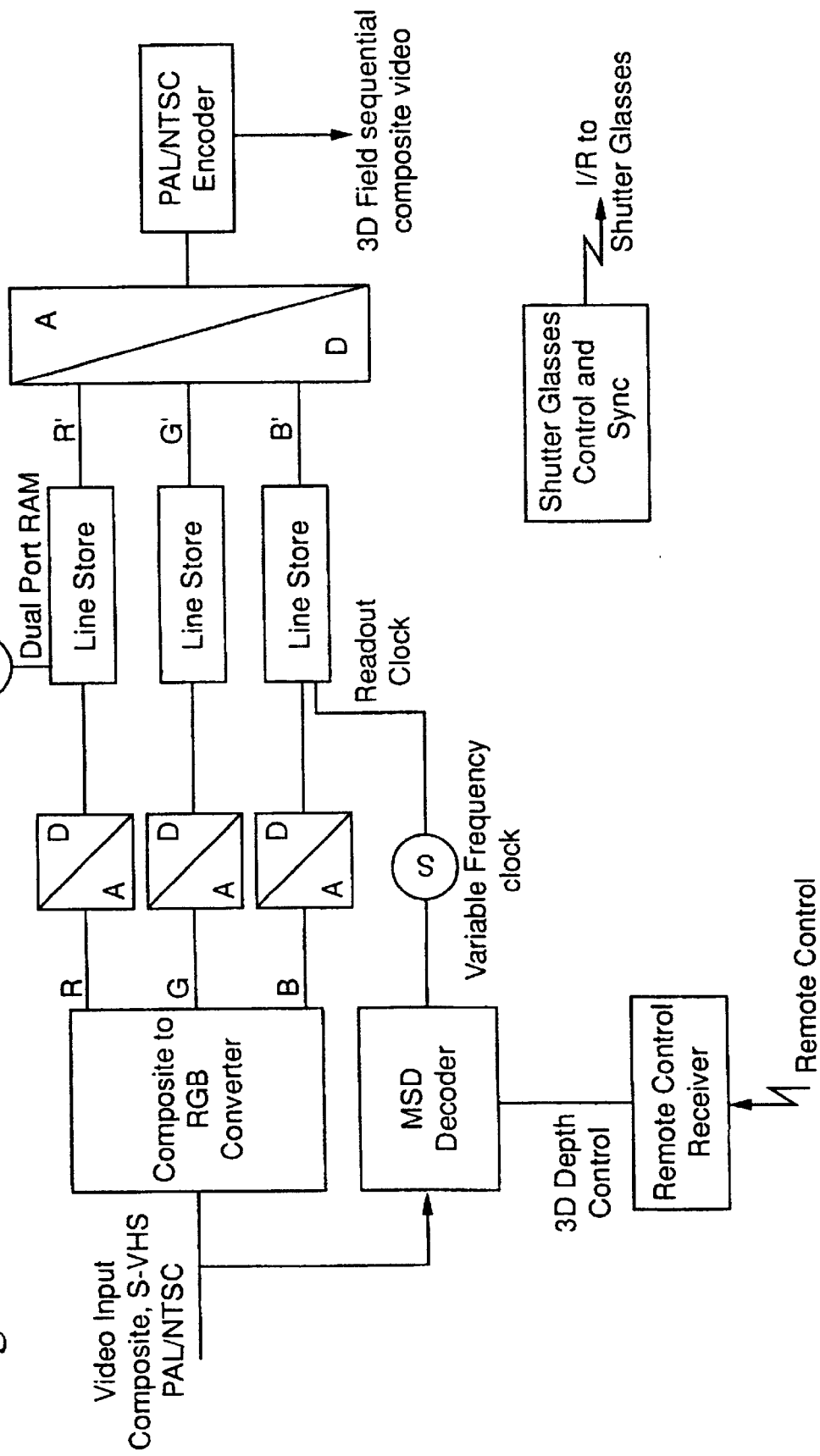
Figure 11:
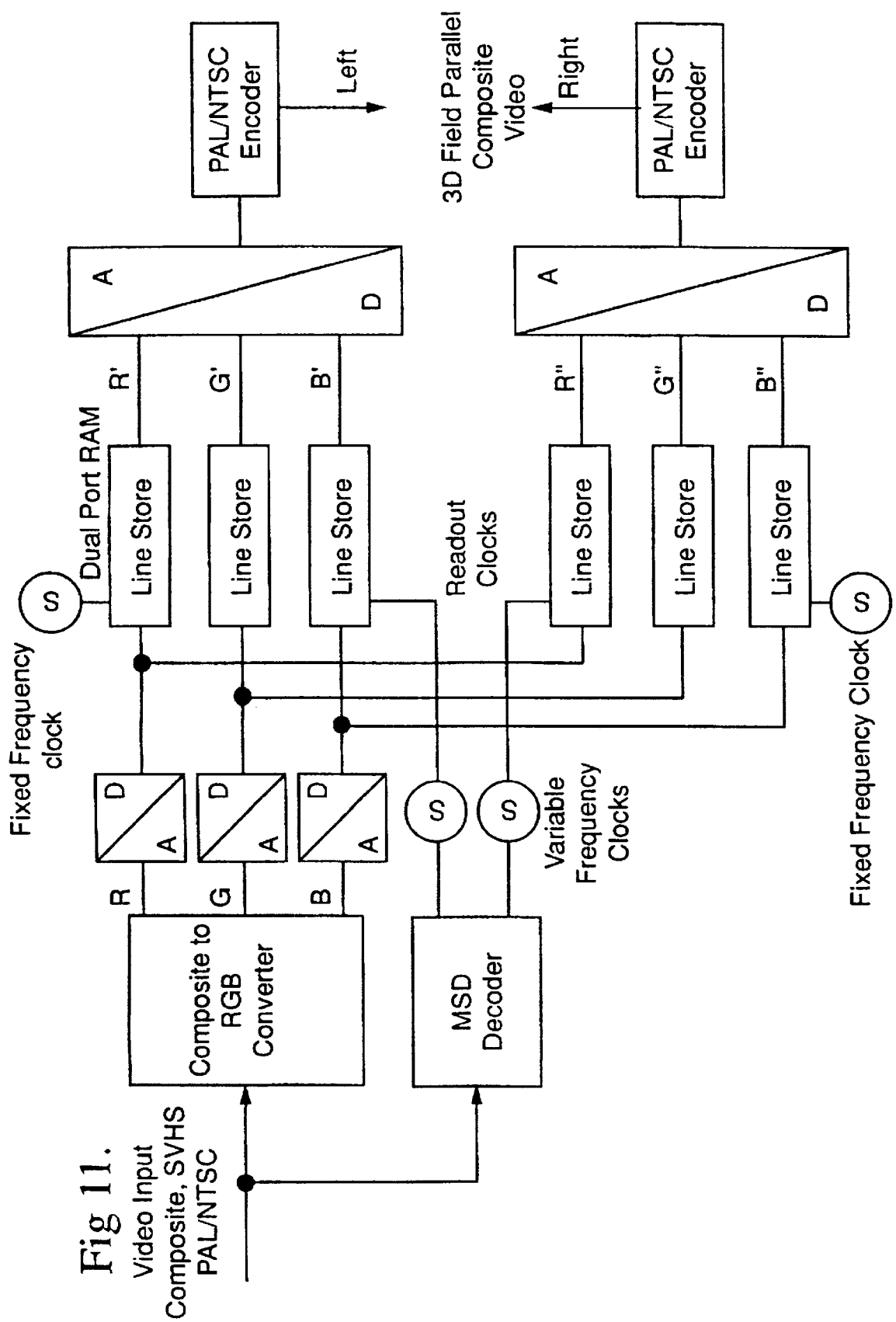
Figure 12:
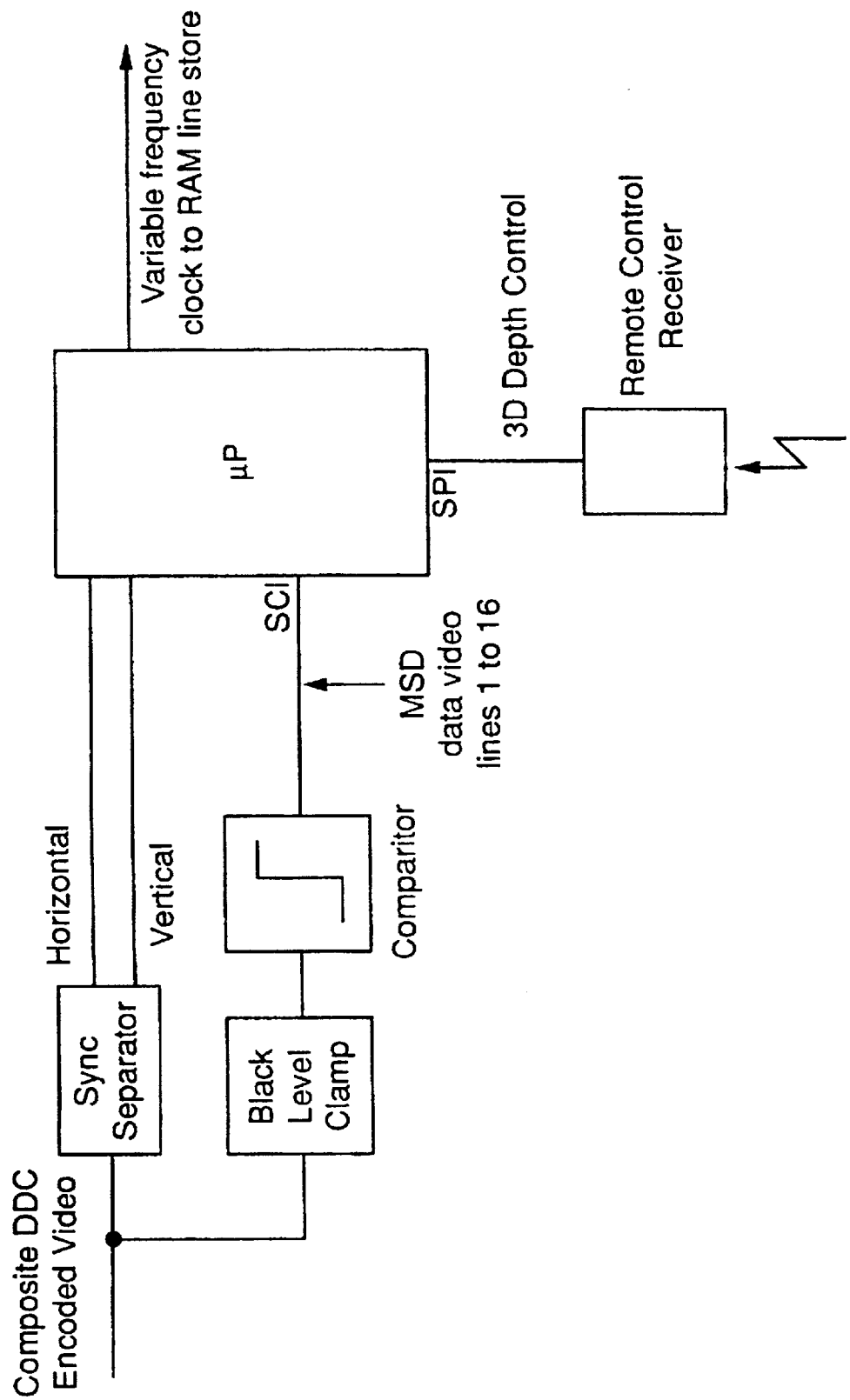
Figure 13:
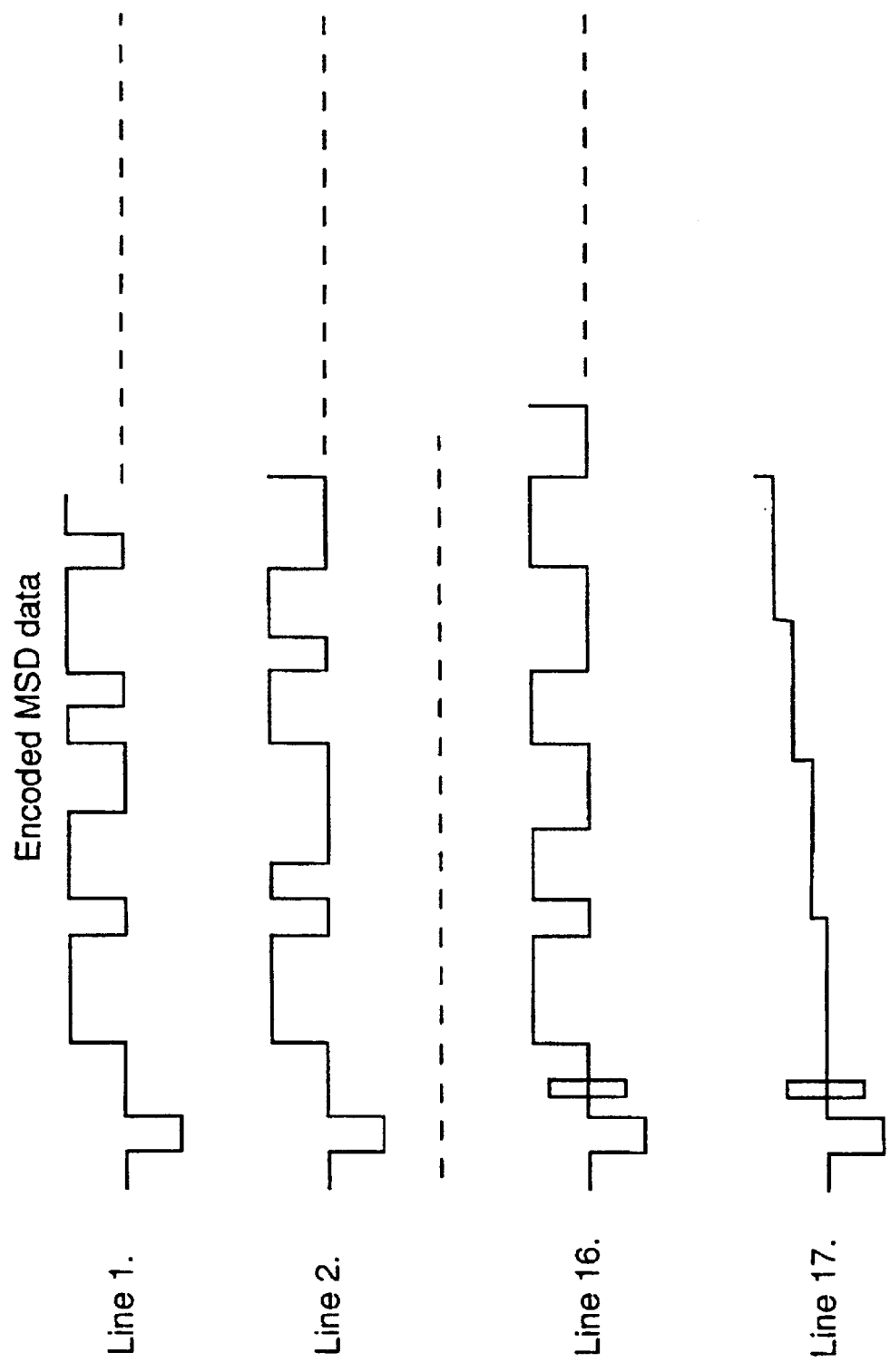
Figure 14:
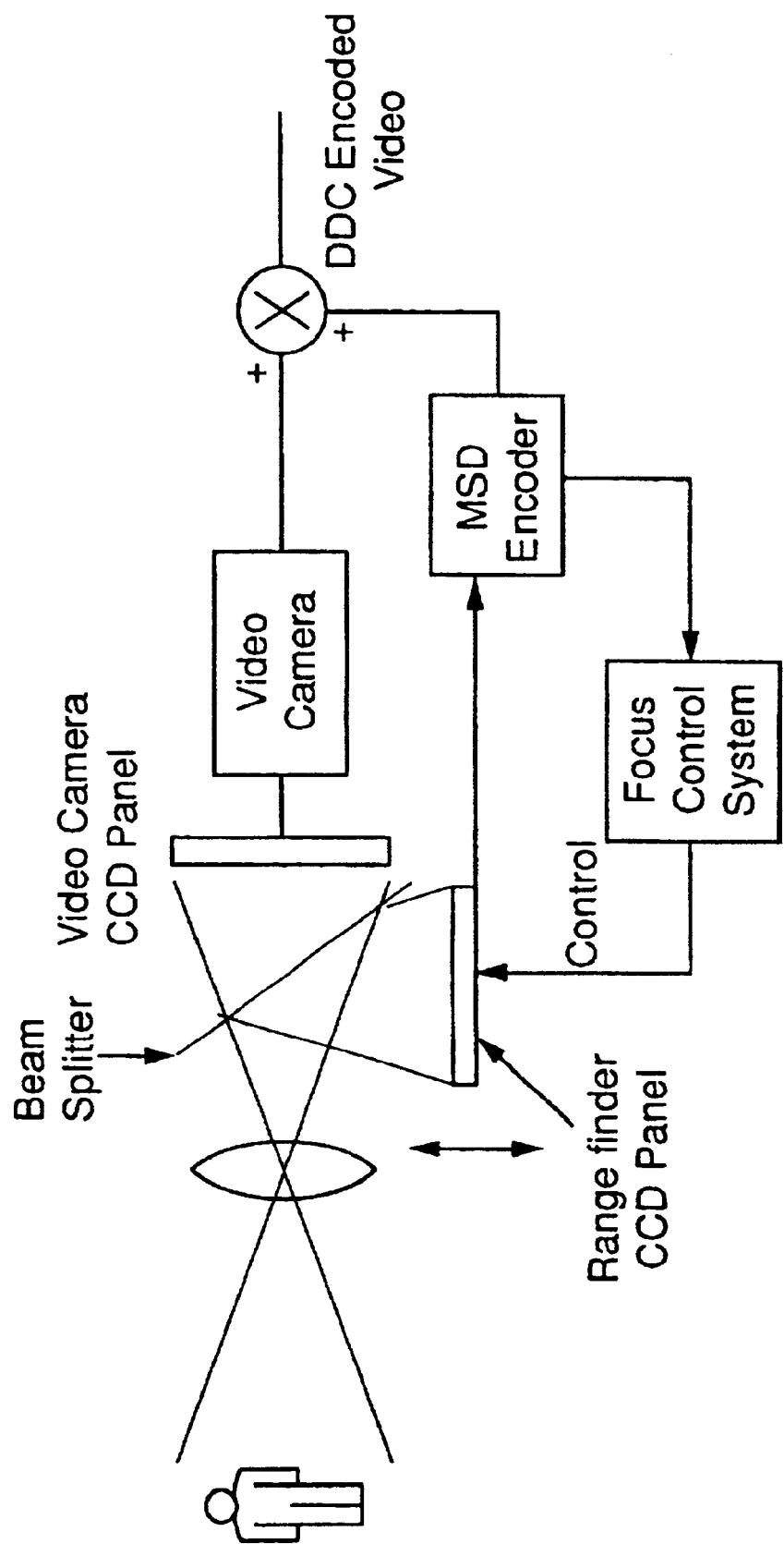
Figure 15:
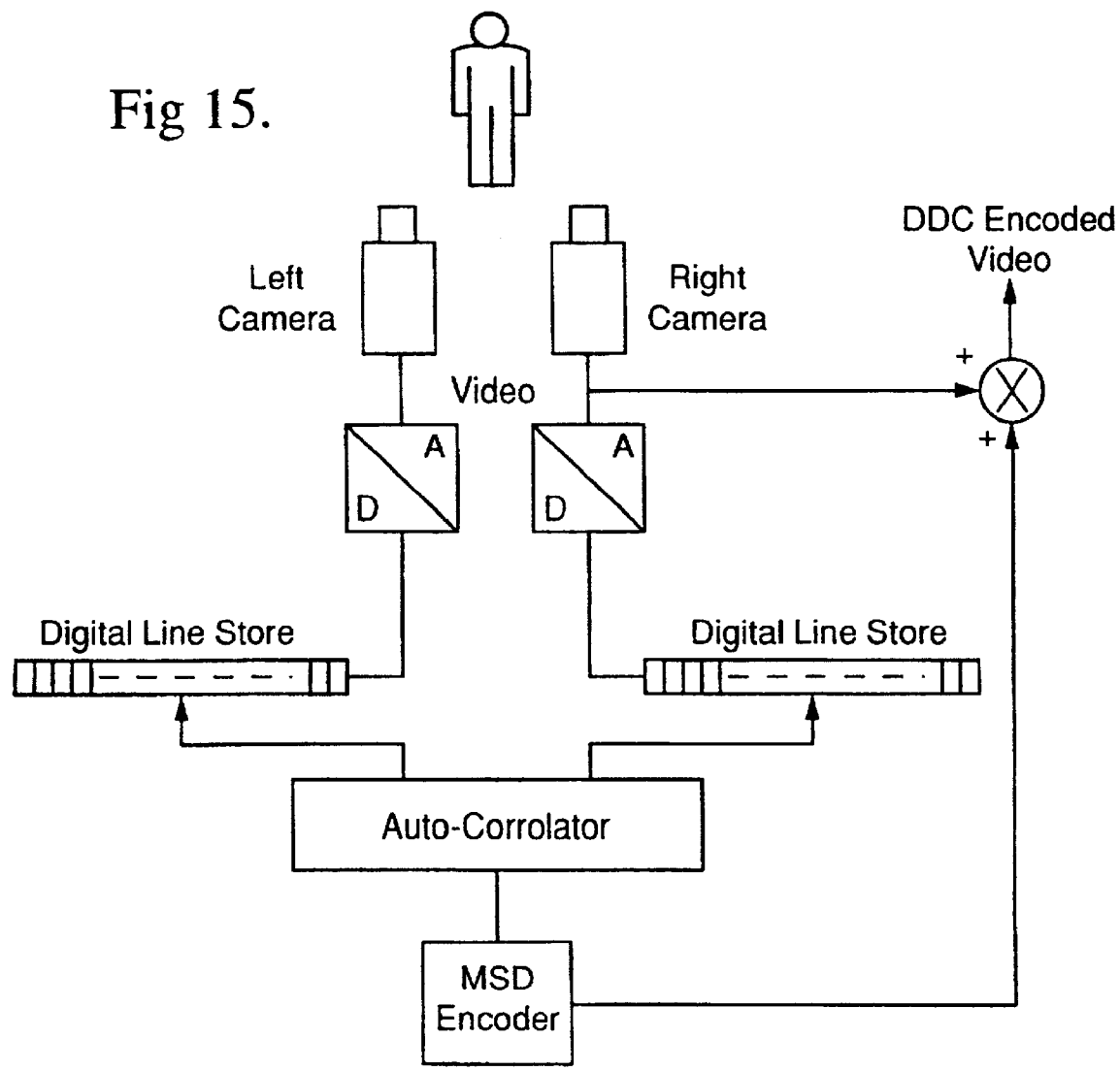
Figure 16:
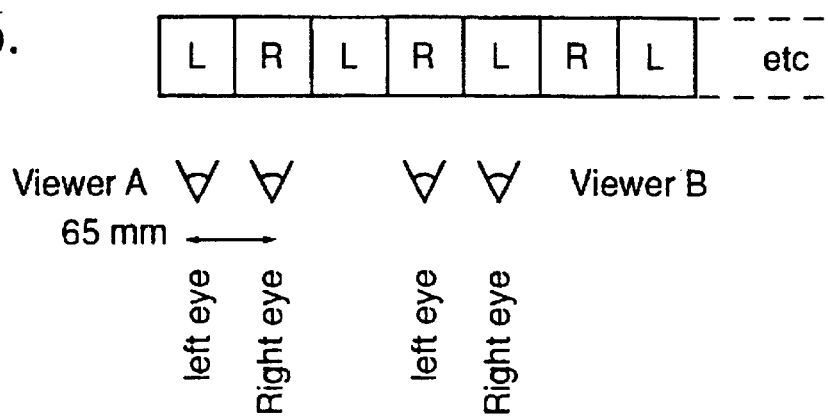
Figure 17:
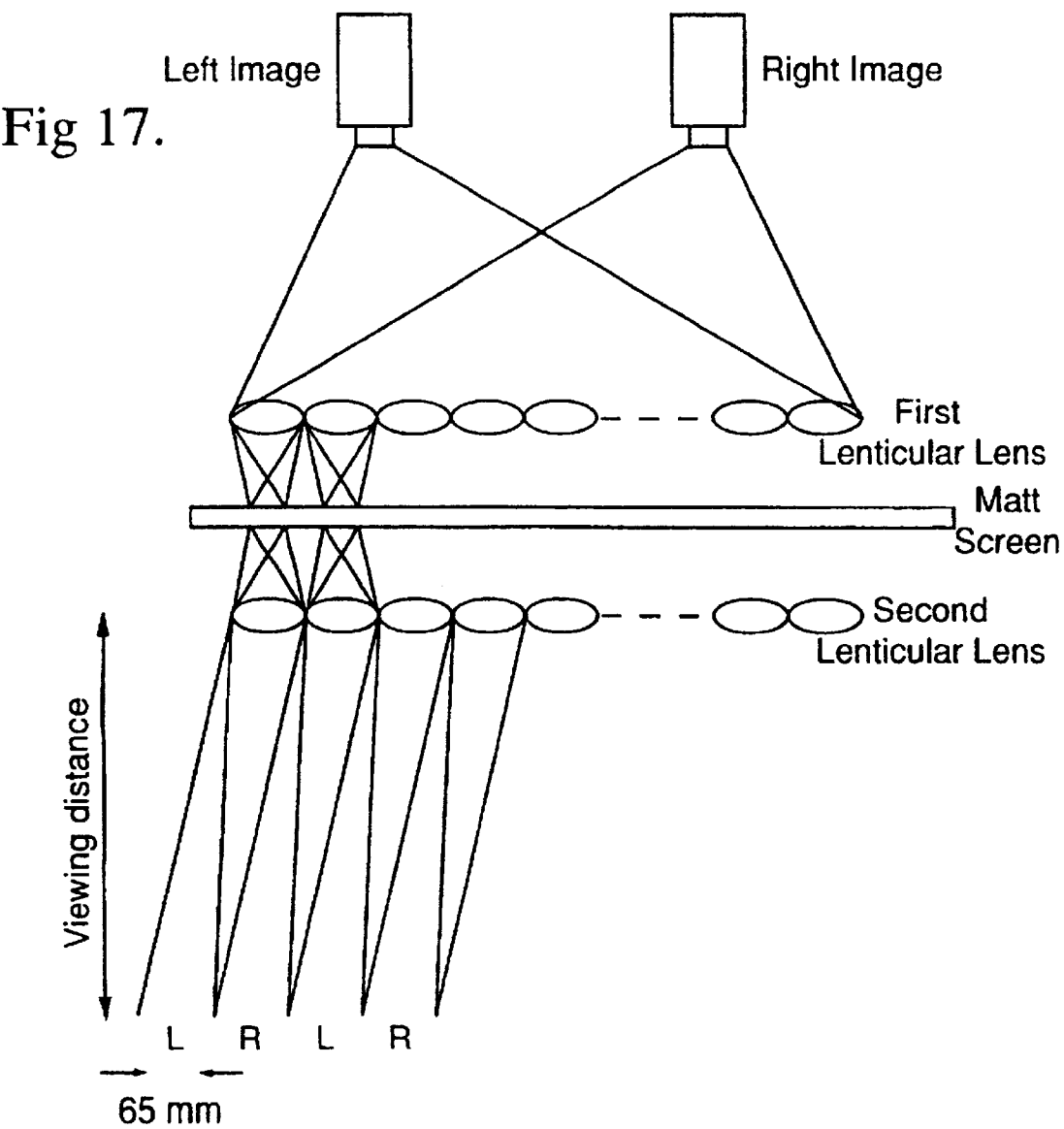

In the drawings:
FIG. 1 shows an original image and conventional left and right images for providing a 3D or stereoscopic image;
FIG. 2 shows an original image and left and right Images for providing a 3D image produced using a cut and paste technique;
FIG. 3 shows an original image and an image generated by the Dynamic Depth Cueing (DDC) method according to the present invention;
FIG. 4 shows a left and right image and the resultant 3D image according to the present invention;
FIG. 5 shows an image distorted discontinuously by a distortion mesh;
FIG. 6 shows an image distorted continuously by a distortion mesh;
FIG. 7 shows example Mesh Spatial Displacement (MSD) data for a left and right mesh;
FIG. 8 shows a flow chart illustrating how MSD data is added to a video image according to the present invention;
FIG. 9 shows a block diagram indicating how a DDC decoder is incorporated in a video chain according to the present invention;
FIG. 10 shows a block diagram indicating a possible implementation of a DDC decoder unit according to the present Invention providing field sequential composite video outputs;
FIG. 11 shows a block diagram of another possible implementation of a DDC decoder unit according to the present invention providing field parallel composite video outputs;
FIG. 12 shows a block diagram of one version of a MSD decoder according to the present invention;
FIG. 13 shows how MSD data is encoded in the composite video signal;
FIG. 14 shows a block diagram of an arrangement for providing real time generated DDC encoded video images;
FIG. 15 shows a block diagram of an alternative arrangement for providing real time generated DDC encoded video images;
FIG. 16 shows the principle of operation of multi-viewer 3D systems;
FIG. 17 shows a block diagram illustrating the principle of operation of a lenticular lens based 3D system;
FIGS. 18 and 19 respectively show a multi-projector system using a lenticular lens assembly; and
FIG. 20 shows a multi-projector system incorporating a DDC decoder according to the present invention.

The method according to the present invention for enabling 2D or "monoscopic" video signals to be converted to 3D or "stereoscopic" video signals is referred to as Dynamic Depth Cueing (DDC) in the following description and embraces the following but is not limited to these techniques:
 a) 3D GENERATION—A technique and procedure for converting 2D images into 3D stereoscopic image pairs and for producing the 3D conversion data.
 b) 3D SCRIPTING—A technique to describe the changes required to be made to a 2D image in order to convert it to a 3D stereoscopic image pair. Describes which objects are selected, how they are processed and provides for a means of storage of 3D data.

c) 3D DATA ENCODING—A technique for adding information to a 2D video image in a defined format. The resulting modified video is compatible with existing video recording, editing, transmission and receiving systems.

d) 3D STANDARDISED PROTOCOL—The 3D Conversion data is added to the 2D video using a defined data format or standardised protocol. This protocol may well become a world-wide standard for adding 3D Conversion data to 2D transmissions.

e) 3D DATA DECODING—A technique for receiving the 2D video image plus conversion data and to extract the information added to a 2D video image so that a 3D stereoscopic image pair may be synthesised.

f) 3D SYNTHESIS—A technique to manipulate the 2D video image using the conversion data to synthesise a 3D stereoscopic image pair.

In order to convert a 2D image to a simulated 3D image it is necessary to modify the original image to produce two slightly different images and present these separate images to the left and right eyes independently. The modification to the original image consists of a lateral shift of objects within the image plane (located at the projection or viewing screen) in order to give the impression of depth.

To make an object in an image appear farther away from the viewer, with respect to the image plane, then it is necessary to present the object within the image to the left eye with a slight left lateral shift and that to the right eye with a slight right lateral shift. This is illustrated in FIG. 1. To make an object appear to the viewer to be closer, it is necessary to shift the object within the image for the left eye laterally to the right and the object within the image for the right eye laterally to the left. For an object to be positioned at the image plane the object is placed in the image at the same position for both eyes.

When viewing objects in the real world, a viewer also makes use of focus information. However, with simulated 3D this information is not present and if the lateral shifts are made too great, particularly in order to bring an object closer to the viewer, then the object appears to break into two separate images and the 3D effect is lost.

The left and right images can be produced using a computer. The image is firstly digitised using a video digitiser and the resulting data stored in memory. The two new images can then be generated.

The simplest way to generate the new left and right images with the required lateral shift is to "cut" the objects from the image and "paste" them back with the necessary lateral displacement, this will be referred to as the "cut and paste" technique. This can be done by first defining the position of an object to be "moved" by identifying it then "cutting" the object from the image and moving it laterally.

The problem with this simple technique is that once the selected object is moved the background is also removed and a blank region in the background results, see FIG. 2.

According to the present invention, an object within an image is "stretched" to provide the necessary lateral shift and retain the original background detail. The resulting lateral distortions of the image are smoothed mathematically so that the resultant effect is perceived as 'real' 3D with little or no visual artefacts.

To better visualise the effect of this stretching on the image, imagine that the image to be converted has been printed onto a thin sheet of rubber. It is possible to pick a point on the surface of the image, adjacent to an object, and stretch it into a new position, to the right of its original position for example. The section of the image to the right of the object is therefore compressed and that to the left stretched, see FIG. 3. To the viewer the object now appears distorted if viewed by both eyes.

However, if a similar but oppositely stretched image is presented to the other eye, then the viewer does not see a distorted image, rather an object that has 3D characteristics. This is illustrated in FIG. 4.

The "stretching" of an object within an image can be undertaken electronically. The objects of interest in each video frame are firstly identified by outlining them. For each object a depth or mesh distortion characteristic is also defined. The stretching can be conducted by enabling an operator to stretch the image and view the effect of the resulting 3D image in real time. Operator skill and artistic intervention can be used to determine the 3D impact of the resulting image and subsequent video sequence. Whilst individual video frames could be converted manually (ie. non real time) we also envisage automatically (ie. real time) converting a series of related frames that form a video "clip". The operator will define the start and end frames of the video clip to be converted. They will also determine the relative depth of each object, relative to the image plane, In the start and end frames. The video clip will be processed using the start and end positions and depth of each object in the clip, to interpolate the required stretching or manipulation for the intermediate frames.

In the case of multiple overlapping objects which have different depths, foreground objects are given priority. This is inherently the case, since the original 2D image has been captured with a single camera, thus the pixel information has automatically been prioritised to the foreground.

This "stretching" of the image can be undertaken electronically by manipulating the digitised image. A mesh (grid) is temporarily placed over the image to be distorted such that, prior to distortion, the co-ordinates of each row and column of the mesh is 0,0. The mesh x co-ordinates are altered which results in the underlying image being distorted. Rather than just the image area immediately under the mesh line being moved, which would result in a discontinuity—FIG. 5, adjacent mesh lines are also moved to produce a smooth distortion, FIG. 6.

The coarseness of the distortion mesh determines the impact of the 3D effect. The coarser the mesh the more splined other objects closer to the object being stretched are impacted. This results in a lower 3D impact in the resulting image. A finer mesh results in sharper edges to the objects, a higher impact 3D effect, but greater edge discontinuities. The order of the distortion mesh will for explanation purposes be assumed to be 16×16. Information on each subpoint on the mesh (ie. co-ordinate positions after distorting) are encoded so as to produce background and foreground subpoints. For example, 4 bits can be used for the subpoint encoding which will result in 16 different levels, 4 background and 12 foreground. The format of the subpoint encoding can also be determined by experimentation and adjusted to suit the application.

Alternatively, this mesh distortion process may be defined by a mathematical algorithm which would enable automatic processing of images.

Note that once the mesh distortions for the left eye have been determined, then the co-ordinates of the distortions for the right eye are simply obtained by scalar multiplication of the matrix by −1 (ie. shifted in the opposite lateral direction by the same amount) and can be calculated automatically. This is illustrated in FIG. 7.

The matrix that is formed from the relative horizontal offset of each intersection point of the distorted mesh defines the Mesh Spatial Displacement (MSD) data.

In order to fully define and reproduce the resultant 3D image all that is necessary is to provide the original, unaltered, 2D image and the MSD data. Thus 3D images may be stored, transmitted, generated, edited, and manipulated by considering the 2D image and an associated MSD data tile.

It is therefore possible to store and transmit 3D images over conventional 2D video systems by encoding MSD data within each video frame. Since the original 2D video image is stored and can be transmitted without alteration, the resulting video is fully compatible with all existing video and television systems. Existing 2D TV receivers will display a normal picture.

A number of existing techniques can be used to add the MSD data to the 2D image such that it is not detected by the viewer and is compatible with existing video standards. These techniques include, but are not limited to:

a) inserting the MSD information in the spare lines at the top and bottom of the picture that are set at black level, ie. in a similar manner to the addition of "Teletext" data;

b) in the unseen over-scan region at the left and right of each image;

c) in the horizontal sync period, along the lines of the British Broadcasting Corporation "sound in sync" system.

In the future, with the introduction of digital HDTV, spare digital data frames will be available to insert the MSD data.

The process of adding the MSD data to a 2D video image to form a DDC encoded video frame is illustrated in FIG. 8.

The amount of MSD data is small, estimated to be approximately 100 bytes per frame. This can be further compressed if necessary, for storage and transmission, by using standard data compression techniques such as run-length or differential encoding.

Because of the small amount of data, the required data rate is also low. It is also possible to use spatial and temporal compression to further reduce the data required since the MSD data does not vary rapidly over a number of frames. The exact time relationship between the MSD data and its associated frame is not critical, a displacement error of one frame is probably acceptable.

Again due to the small amount of data, low data rate and non-critical alignment, the MSD data could be sent over a number of frames ie. four frames with a quarter of the information in each frame.

A block diagram indicating how a DDC decoder is incorporated in a video chain is shown in FIG. 9. DDC encoded video, which can be obtained via any existing video source i.e. terrestrial, satellite etc, is applied to the input of a DDC decoder. One output of the decoder is a standard video waveform (or video modulated radio frequency signal) that will drive a standard TV display and enable a viewer wearing shutter glasses, synchronised by the DDC decoder, to view a 3D image.

Additionally outputs are available from the DDC decoder to drive other 3D display devices such as Virtual Reality headsets or an autostereoscopic display as described in Australian application No. 66718/94.

One possible implementation of the DDC decoder is shown in FIG. 10. Incoming video, which can be PAL or NTSC, in composite or S-video format, is applied to a composite RGB or component video converter. Each of the RGB or component video outputs is applied to an analog to digital converter and the digital output fed to the input port of a dual port RAM line store. Each line of digital video data is entered into RAM at a constant speed. The data is read out of the line store at a rate determined by a variable frequency clock controlled by the output of the MSD decoder.

The effect of reading out the line data from the RAM at a variable rate causes the resulting video to be stretched or compressed in accordance with the MSD data.

The converted data is then applied to a digital to analog converter and a PAL/NTSC encoder. The resulting 3D field sequential composite video signal is applied to the display. (Note: this process can also operate with the video signals read into the line stores at a variable rate and read out at a fixed rate. It is necessary to convert the incoming composite video signal to RGB or component video since, as the output from the line store is read out at a variable rate, the chrominance frequency would change and cause display errors.)

DDC decoding may also be implemented using a field or frame store. In this case the full mesh from the MSD data is restored with pixel distortions (lateral shifts) being calculated over the complete field or frame.

The 3D stereoscopic image pair is then displayed from the resulting RGB or component video output.

The shutter glasses controller provides an infra-red light source that provides timing pulses for the shutter glasses. The controller is synchronised by the PAL/NTSC encoder. Additionally, the controller commands the shutter glasses to remain open during scenes that are not 3D encoded, or not suitable for 3D encoding, thus providing improved image quality during those portions of the video sequence.

FIG. 11 shows the block diagram of a DDC decoder that produces 3D field parallel composite video outputs. The MSD decoder produces two variable speed clocks, one for the left and one for the right RAM line stores. This form of decoder is suitable for replacing the field stores in the applicants' existing autostereoscopic 3D displays. Note that this technique provides left and right video sources that are at the same field rate as the original 2D video source, ie. field sequential video output is produced.

Alternatively a non-field video output may be produced at the output at a higher resolution scanning rate than the 2D image.

FIG. 12 shows a block diagram of one version of a MSD decoder. In this case it is assumed that the MSD data is encoded in the composite video signal in the first 16 lines of the video signal, FIG. 13. Incoming composite video is fed to a sync separator which provides vertical and horizontal timing signals for the microprocessor. Additional the video is fed to a black level clamp circuit, comparator and level shifter. The output from the level shifter is a TTL level signal which contains the serial encoded MSD data on lines 1 to 16 of the video signal. The microprocessor loops waiting for a horizontal sync pulse, after determining the horizontal sync pulse for line 1 the microprocessor reads the next 16 bytes. A similar process is repeated on the following 15 lines until the MSD data has been read. Based upon the MSD data received the microprocessor provides the variable speed clock for the digital video line store on each subsequent video line. The microprocessor maintains an index to which video line is being processed by counting the line sync pulses.

Depth perception of 3D images varies between viewers. Also when viewing 3D images with shutter glasses the "strength" of the 3D image requires adjustment with viewing distance. The strength of the 3D image can be altered with a remote control device which, via an algorithm applied by the microprocessor, allows the strength of the 3D image to be varied by the viewer. The algorithm alters the magnitude of each element in the MSD matrix thus altering the strength of the 3D effect. It is anticipated that once the preference for a particular viewer has been entered then this setting will be maintained by the decoder unit.

There are many techniques for the real time generation of DDC encoded video images. In one such technique the distance between the camera lens and an additional, range finding, Charge Coupled Device (CCD) array is altered—FIG. 14. This will produce a series of frames with each object in the image at varying stages of focus. A sharpness detecting algorithm is then run across the series of frames and a sharpness index for each object in the image determined. We then determine on which frame each object was the sharpest, this indicates on which focal plane the object is on. This information is then used to form the MSD data.

FIG. 15 indicates another technique whereby two video cameras are used to create separate left and right eye images. The luminance information from each camera is digitised and fed to a line store. An autocorrelator, or similar operation, compares the bit patterns within the two line stores (left and right by 16 elements) and looks for a match. The difference (distance) between the video patterns, which represents objects in the image, is used to produce the MSD data. One of the camera outputs is combined with the MSD data in real time to produce DDC encoded video.

Alternatively a stereoscopic video camera could be used in place of the two video cameras.

DDC may be used to overcome a serious shortcoming of existing, non eye-tracking, autostereoscopic 3D multiviewer systems. These systems provide a 3D image by producing a repeating sequence of left-right images as illustrated in FIG. 16. The distance between each successive image is 65 mm which is equal to the distance between the viewers eyes. Therefore a viewer located at position A will see a correctly sequenced 3D image.

However, should the viewer move laterally 32 mm, or be at position B, then the left image will be seen by the right eye and the right image by the left eye. ie. the viewer sees a "reverse 3D" image. The reverse 3D image is very uncomfortable to view and after a short while causes viewer distress ie. headache.

Most multiviewer autostereoscopic system have this shortcoming. In particular those based upon lenticular lenses and grid type image separators. A multiviewer, lenticular lens based, autostereoscopic system is illustrated in FIG. 17. The image from the left projector passes through the first lenticular lens and is focused on the surface of a matt screen. A second lenticular lens refocusses this image to form a vertical stripe of light at the viewing distance. A second projector, containing the right image, also illuminates the first lenticular lens, however, due to a lateral displacement between the two projectors, the resulting right eye image, at the viewer plane, is displaced 65 mm from the left image. This sequence of alternate left right images, spaced 65 mm apart, is repeated.

A viewer in the correct position views a correct 3D image, however, reverse 3D images are also presented should the viewer move or be incorrectly positioned as explained above.

In practice, when first sitting down to view a lenticular lens based 3D system it is difficult for the viewer to determine if a correct or reverse 3D image is being viewed. It is not until discomfort is felt that the viewer is aware of being incorrectly positioned.

Additionally, it is difficult for a viewer to maintain the correct viewing position for an extended period of time. It is also necessary that the viewer be positioned the correct distance from the second lenticular lens, since if viewed at the incorrect distance morae fringing and cross talk effects tend to occur.

An additional problem with lenticular lens based system is resolution. The resolution is limited by the pitch of each "lens-let" in the overall lenticular lens, which is in the order of 1 mm across.

Instead of projecting just left and right images, consider a lenticular lens based system using a number of projectors, say four, such as to produce a series of images 1,2,3,4 each spaced 65 mm apart, as per FIG. 18. The original scene has been recorded using four cameras with the same sequence and spacing. A viewer at positions A, B or D sees a correct 3D image whilst at position C the viewer sees a reverse 3D image.

This is a substantial improvement over the previous left right system since now an acceptable 3D image is viewable over 3 times the lateral distance. Note that, as with the previous left right system, a viewer will not be aware, until discomfort is felt, that position D is providing a reverse 3D image.

If now projector four is replaced with a "null" image (black), FIG. 19, then positions A and B work as before. position C produces a monoscopic image in the right eye and a black image in the left, which is still viewable without viewer discomfort. Similarly position D produces a monoscopic image but again without a reverse 3D effect. We thus have a system where 50% of the viewer locations produce a correct 3D image and 50% a slightly inferior, although not objectionable, images and the reverse 3D effect has been eliminated.

By increasing the number of projectors, and including a null image, the lateral distance over which a correct 3D image can be viewed is increased and the reverse 3D effect has been eliminated.

It is however not considered practical to implement such a multi-projector system, primarily because the transmission/recording bandwidth necessary to provide video images to each projector becomes impractical as the number of projectors is increased.

The limitations of this approach can be overcome by transmitting a DDC encoded 2D image and using DDC to synthesise the required number of projection images. Whilst a wide bandwidth is required within the DDC decoder, the original 2D bandwidth is maintained at the transmitter and/or recording equipment.

A multiviewer 3D, lenticular lens based, system using a DDC decoder is shown in FIG. 20.

DDC encoding/decoding will enable the production of a sequence of video images that represent the range of possible images from the extreme left of the original image to the extreme right, as follows:

$$[L, L_1, L_2 \ldots R_2, R_1, R]$$

In summary some of the applications may be described by:

DDC, or Dynamic Depth Cueing, is a term for a form of data derived from the 2D to 3D conversion process which is in an intermediary stage of conversion. At this stage the data consists of the original video signal and a data packet (encoded either in digital or analogue form) such that this additional data is all that is required to instruct specific electronics hardware and/or software to complete the conversion task. The resultant 3D information can take the form of either a field sequential (ie. left/right) type video format, two separate video streams, a line be line system (ie. 1 line from left field, 1 line form right field), or some other format that is advantageous.

Through careful design of the format of the conversion data packet it is possible to include this additional data such that it is not noticed when displayed on a standard TV. Thus it becomes possible to introduce 3D television transmissions without upsetting the existing television infra-structure. The decoder could be located near to the viewing device (ie.TV) and essentially be a 'black box' that intercepts the transmission signal decodes it and then outputs it to the TV for viewing. Therefore upgrading of existing 2D pay TV or television network structures would be simplified by the addition of a 'black box' for each TV.

In the provision of media for MULTI-IMAGE type autostereoscopic 3D displays systems. These systems rely on the provision of multiple images with slightly differing perspective views. They can be quite effective if the number of different views is large (Say 8–16) in that they allow true multiviewer capability. Their major drawback is that because they require many different views to all be available at the same time the provision of the media is extremely difficult even utilising sophisticated video compression techniques. However, if a DDC decoder is used to generate the 3D media it becomes possible to generate as many individual perspective views as are required, and as this image equipment. ie. TV's and video recorders, as normal 2D images. The viewer is not aware of any changes to the transmitted image.

Standard 2D video images which have been DDC encoded have the following characteristics:

DDC encoded 2D images can be received on standard video equipment ie. TV's and video recorders, as normal 2D images. The viewer is not aware of any changes to the transmitted image.

DDC encoded images are fully compatible with all existing video, editing, recording, receiving and transmission systems and technologies. Thus DDC encoded 2D video images are transparent to all existing analog video and television technologies.

DDC encoded 2D video can be introduced to the market place in a similar manner to the introduction of colour TV and stereo sound. Only TV sets fitted with DDC decoders (with viewers using appropriate viewing glasses), or 3D TV's, will display the 3D images.

DDC encoding enables seamless transition between scenes that will benefit from 3D encoding and those that are more beneficially displayed in 2D. This transition is not noticed by the viewer.

DDC encoded video may be displayed on all existing 3D displays and is suitable for multi-viewer systems.

DDC encoding retains the original video source's line and field standards.

DDC encoding does not reduce the image update frequency as is the case when encoding 3D video images in Left/Right field sequential format.

The claims defining the invention are as follows:

1. A method of producing left and right eye images for a stereoscopic display from an original 2D image comprising displacing selected areas of said original 2D image by a determined amount and direction to thereby generate stretched images, said stretched images forming said left and right eye images, wherein each of said left and right eye images includes portions of said original 2D image which have been compressed and portions of said original 2D image which have been stretched.

2. A method of producing left and right eye images for a stereoscopic display from an original 2D image including the steps of:

a) identifying at least one object within said original image, b) outlining said or each object, c) defining a depth characteristic for said or each object, d) respectively displacing selected areas of said or each object by a determined amount in a lateral direction as a function of the depth characteristic of said or each object, to form two stretched images for viewing by the left and right eyes of a viewer, wherein said or each object in the stretched image for viewing by the left eye of the viewer includes portions which have been compressed and portions which have been stretched and wherein said or each object in the stretched image for viewing by the right eye of the viewer includes portions which have been compressed and portions which have been stretched.

3. A method as claimed in claim 2, including displacing the production of the original 2D image while avoiding any blank regions in the image.

4. A method as claimed in claim 2 wherein one of said stretched images is a mirror image of other said stretched image.

5. A method as claimed in claim 2 wherein a separate depth characteristic is provided for each said object.

6. A method as claimed in claim 2 wherein the steps are performed on a plurality of 2D images.

7. A method of producing left and right eye images for a stereoscopic display from a digitised 2D image Including the steps of:

forming a mesh over said digitised image, said mesh initially having a plurality of parallel lateral mesh lines and a plurality of parallel longitudinal lines, wherein said lateral lines are positioned at right angles to said longitudinal lines and intersect to form a plurality of sub-points; and distorting the mesh by moving said sub-points to thereby stretch the underlying image.

8. A method as claimed in claim 7 wherein said mesh lines between adjacent sub-points remain continuous at the conclusion of any distortion.

9. A method as claimed in claim 7 wherein said distorting includes displacing the sub-points in a lateral direction to distort the mesh.

10. A method as claimed in claim 7 wherein the amount of distortion of each sub-point is used to produce data to enable the conversion of an original 2D image into left and right eye images for a stereoscopic display; said data describing which objects within an image are to be processed, how said objects will be processed, priority of said objects over other objects and their depth characteristics.

11. A method as claimed in claim 10 wherein a mathematical algorithm defines the distortion required for each said sub-point.

12. A method as claimed in claim 10 wherein the original 2D image and conversion data is capable of transmission along standard 2D technology.

13. A system for producing left and right eye images for a stereoscopic display from an original 2D image, including means for selecting areas of said original image and means for displacing said selected areas by a determined amount and direction to thereby generate stretched images, said stretched images forming said left and right eye images, wherein each of said left and right eye images includes portions of said original 2D image which have been compressed and portions of said original 2D image which have been stretched.

14. A system for producing left and right eye images for a stereoscopic display from an original 2D image including:

means for identifying objects within said original image, means for defining a depth characteristic for each object, means for displacing selected areas of each object by a determined amount in a lateral direction as a function of the depth characteristic of each object, to thereby form two stretched images for viewing by the left and right eyes of the viewer, wherein each object in each of the two stretched images includes portions which have been compressed and portions which have been stretched.

15. A system as claimed in claim 14 including means for creating a mirror image of one stretched image.

16. A system as claimed in claim 14 wherein said means for defining a depth characteristic is capable of defining a separate depth characteristic for each object in the image.

17. A system as claimed in claim 14 wherein said system is capable of converting a plurality of 2D images.

18. A method of producing left and right eye images for a stereoscopic display from an original 2D image comprising:

compressing a first selected area of the 2D image by a determined amount and stretching a second selected area of the 2D image by the determined amount to form a stretched left eye image; and compressing a third selected area of the 2D image by the determined amount and stretched a fourth selected area of the 2D image by the determined amount to form a stretched right eye image.

19. A method of producing left and right eye images for a stereoscopic display from an original 2D image including the steps of:

a) identifying an object within the original 2D image, b) outlining said object, c) defining a depth characteristic for said object, d) compressing and stretching, respectively, first and second selected areas of said object by a determined amount in a lateral direction as a function of the depth characteristic of said object, to form a stretched image for viewing by the left eye of a viewer; and e) compressing and stretching, respectively, third and fourth selected areas of said object by the determined amount in the lateral direction as a function of the depth characteristic of said object, to form a stretched image for viewing by the right eye of the viewer.

* * * * *